(12) United States Patent
Hu et al.

(10) Patent No.: US 7,726,946 B2
(45) Date of Patent: Jun. 1, 2010

(54) SANITARY REMOVABLE IMPELLER HUB AND METHOD

(75) Inventors: Xiaobing Hu, Rochester, NY (US); Robert Blakley, Rochester, NY (US); Rory Heinlein, Churchville, NY (US)

(73) Assignee: SPX Corporation, Charlotte, NC (US)

( * ) Notice: Subject to any disclaimer, the term of this patent is extended or adjusted under 35 U.S.C. 154(b) by 738 days.

(21) Appl. No.: 11/600,166

(22) Filed: Nov. 16, 2006

(65) Prior Publication Data

US 2008/0118353 A1    May 22, 2008

(51) Int. Cl.
*B63H 1/20*    (2006.01)
(52) U.S. Cl. ............ 416/204 R; 416/208; 416/244 A
(58) Field of Classification Search ............ 416/244 R, 416/244 A, 204 R, 208, 209
See application file for complete search history.

(56) References Cited

U.S. PATENT DOCUMENTS 5,152,606 A * 10/1992 Borraccia et al. .......... 366/331
6,435,832 B1 * 8/2002 Fasano ................... 416/204 R

* cited by examiner

*Primary Examiner*—Edward Look
*Assistant Examiner*—Dwayne J White
(74) *Attorney, Agent, or Firm*—Baker & Hostetler LLP

(57) ABSTRACT

A hub mounting assembly for mounting a plurality of impellers onto a shaft has a first hub ring and a second hub ring. A first key piece is adapted to engage with the shaft and engage with at least one of the hub rings, and a first lock pin is adapted to engage with the shaft and engage with at least one of the hub rings. In the installed state, the first hub ring is adapted to be fastened to the second hub ring, to trap the key piece and lock pin in a position so that the hub rings together form a hub that is locked against rotation and axial movement with respect to the shaft.

20 Claims, 6 Drawing Sheets

SANITARY REMOVABLE IMPELLER HUB AND METHOD

FIELD OF THE INVENTION

The invention pertains generally to the field of mixing devices and mixing methods. More particularly, the invention pertains to a method for attaching a hub that supports impellers to a rotating shaft inside the vessel so that the shaft will move the impellers inside the vessel to mix material.

BACKGROUND OF THE INVENTION

Mixing devices are in wide use in industry, and many mixing devices include a large vessel which contains a liquid or other material to be mixed. In some types, a typically vertically-oriented impeller shaft runs down some or all of the length inside the vessel. The impeller shaft typically enters the vessel through a bearing and seal arrangement, and the impeller shaft is rotatably driven from outside of the vessel usually by a motor located at the top of the vessel. Inside the vessel, at one or several axial locations on the length of the shaft, radially extending impellers are attached to the shaft which have paddles or blade type features extending radially outwardly. Rotation of the shaft rotates the impellers to mix and or otherwise impart energy to the fluid or other material inside the vessel.

In some instances, the motor and drive assembly, along with the bearing and sealing arrangement, are mounted at the top opening of the vessel, and the shaft is suspended, so that it hangs down from the motor with its lower end being either a free end spaced above the bottom of the vessel, or a lower stub of the shaft may be rotatably supported by a bearing at the bottom inside of the vessel. In the case of long shafts, intermediate steady bearings may be mounted to provide radial support against flexing or bending or vibration of the shaft.

In some instances, the impellers themselves are welded directly onto the shaft at the time of manufacture. This arrangement is often suitable, but also can have the disadvantage that welding of the impellers onto the shaft is relatively permanent. Thus, replacement or substitution of different impellers for different applications is not convenient. Further, the opening in the top of the vessel needs to be large enough to permit a shaft, and the welded impellers all to be inserted through the opening when installing the shaft in the impellers into the vessel. This can require a large opening in the top of the vessel.

To overcome these disadvantages, there are arrangements in which a removable or detachable hub that supports the impellers can be mounted onto the shaft. However, at least some of the removable hub designs suffer from the disadvantages that all of the impellers are mounted to a single removable hub, and thus the hub and impeller assembly, which may be quite large, still needs to fit through the opening in the vessel. Further, some of these arrangements have a disadvantage that they may not be as sanitary as the desired. In many applications, it is desirable to have a very sanitary arrangement which reduces as much as possible any of the mixing material from going into the inside structure of the hub mounting arrangement. Entry of the material into the inside structure of the hub mounting arrangement, and into any gaps, crevices or clearances between the hub and the shaft, can be undesirable because it can lead to difficulty in cleaning the installed arrangement and possible contamination of the material being mixed.

In view of the foregoing, there is a need in the art for a removably attachable impeller hub that can quickly and easily be attached and/or detached to an impeller shaft, which can provide a secure attachment while also having desirable sanitary properties.

SUMMARY OF THE INVENTION

Some embodiments of the invention provide for removably attachable impeller hub apparatus that can quickly and easily be attached and/or detached to an impeller shaft, and a hub attachment method which can provide a secure attachment while also having desirable sanitary properties.

In one aspect, an embodiment of the invention provides a hub mounting assembly for mounting a plurality of impellers onto a shaft, comprising a first hub ring, a second hub ring, a first key piece adapted to engage with the shaft and engage with at least one of the hub rings; and a first lock pin adapted to engage with the shaft and engage with at least one of the hub rings, wherein the first hub ring is adapted to be fastened to the second hub ring, to trap the key piece and lock pin in a position so that the hub rings together form a hub that is locked against rotation and axial movement with respect to the shaft.

In another aspect, an embodiment of the invention provides a hub mounting assembly for mounting a plurality of impellers onto a shaft, comprising a first hub ring a second hub ring a first engaging means adapted to engage with the shaft and engage with at least one of the hub rings and a second engaging means adapted to engage with the shaft and at least one of the hub rings, wherein the first hub ring is adapted to be fastened to the second hub ring, to trap the key piece and lock pin in a position so that the hub rings together form a hub that is locked against rotation and axial movement with respect to the shaft.

In yet another aspect, an embodiment of the invention provides a method for attaching a plurality of impellers to a shaft, comprising installing an upper hub ring at a location on the shaft installing a key piece into engagement with the shaft installing a lock pin into engagement with the shaft and fastening a second hub ring to the first hub ring.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
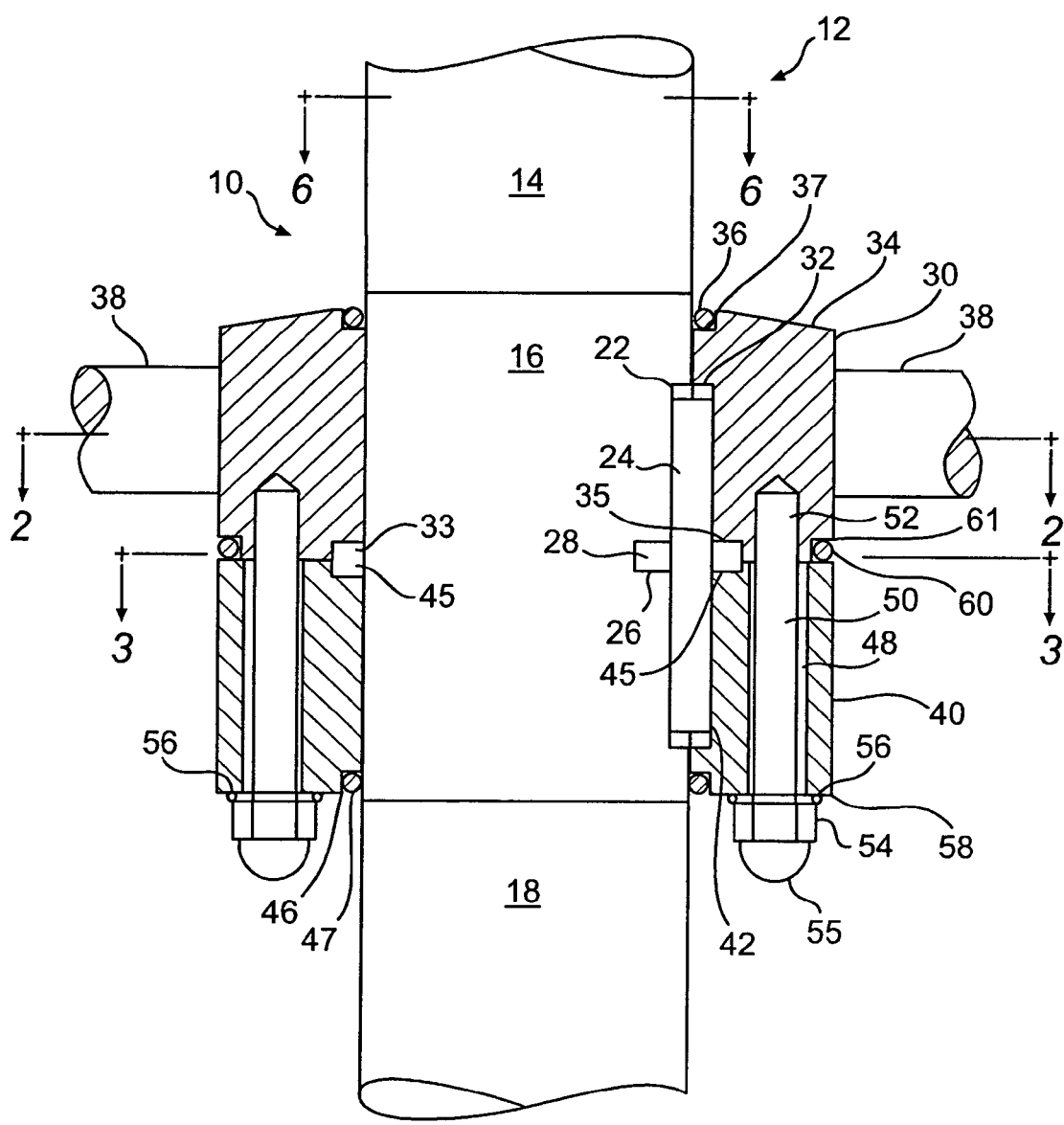
FIG. 1 is a layout/cross-sectional view of a removable impeller hub attachment system and method, according to a preferred embodiment of the present invention and taken through Section 1-1 in FIG. 6.

Some embodiments of the invention provide a removable attachable impeller hub and method for attachment that can quickly and easily be attached and/or detached to an impeller shaft, which can provide a secure attachment while also having desirable sanitary properties. Preferred embodiments the invention will now be described with reference to the drawing figures in which like reference numerals refer to like parts throughout.

FIG. 1 illustrates a preferred embodiment of the invention, in which a mounting assembly generally designated 10 is mounted onto an impeller shaft 12. FIG. 1 illustrates only part of an impeller shaft to which the hub 10 is mounted. The illustrated part of impeller shaft 12 has an upper portion 14, an intermediate portion 16, and a lower portion 18. In a typical mixing vessel application, there may be one or more hubs 10 mounted at different lengths of the shaft 12. Therefore, the reference to upper and lower are for reference with respect to this hub only. Also, although a vertically oriented shaft is shown and described, the shaft in some arrangements can also be horizontally arranged or at any angle.

Also, in this illustrated example, the intermediate portion 16 of the shaft 12 is depicted as having a slightly larger diameter than the remainder of the shaft 12. The intermediate portion 16 may also be different than the rest of the shaft 12 in any of several ways. For example, the intermediate portion 16 may have a different surface finish in order to facilitate interaction with O-rings that are discussed below. Further, making the intermediate portion 16 a larger diameter than the remainder of the shaft 12 may facilitate sliding the hub components 10 over the remainder of the shaft, because there will be a greater clearance between the hubs and the remainder of the shaft, however, there will be a tighter clearance between the hub and the shaft mounting region 16. Further, the thickened region 16 of the shaft can be manufactured by machining of the entire shaft, or by coating or depositing extra material onto the shaft 12 at the region 16.

The shaft 12 includes a longitudinal key way on slot 22 which is able to receive a longitudinal key piece 24. The shaft 12 also has a pin hole 26 which is configured to receive a lock pin 28.

The hub assembly 10 includes an upper hub body 30 which has a keyway or slot 32 that also receives part of the key piece 24. The upper hub 30 has a sloped top surface 34 which is angled downward and away from the shaft 12. The feature of the angled or conical top surface 34 provides a sanitary benefit in that it reduces beads or puddles of material from resting on this top surface 34 after emptying or cleaning of the vessel. Rather, after emptying or cleaning, any material that would otherwise tend to sit on the top surface 34 of the hub assembly 10, instead tends to drain off of this angled portion 34.

The upper hub 30 has an O-ring channel 36 located around its top corner, which is sized just smaller than the volume of on elastomeric O-ring 37. Upon assembly, the elastomeric O-ring 37 is compressed so that it completely fills the channel 36 while bulging outward slightly. This provides a desirable seal, and also reduces the likelihood of material accumulating in the region adjacent the seal after draining or cleaning of the vessel. The upper hub 30 also has a pin receiving notch or groove 35, which in this embodiment is an angular ring around the lower inner corner of the hub 30.

The upper hub 30 also supports two or more impellers arms 38 which can be attached for example by welding. Those will be discussed in more detail below. Although two arms 38 are illustrated, the hub assembly 10 itself can support any number of impellers arms. Various arrangements for having the arms extend from the hub elements are also useful, and some are described in more detail below.

The hub assembly 10 also includes a lower hub body 40. The lower hub 40 also includes a keyway or slot 42 which receives part of the key piece 24. The lower hub 40 has an O-ring channel 46 designed around its bottom corner, which is sized just smaller than the volume of a elastomeric O-ring 47. Upon assembly, the elastomeric O-ring is compressed so that it completely fills the channel 46 while bulging outward slightly. This provides a desirable seal, and also reduces the likelihood of material accumulating in the region adjacent the seal after draining or cleaning of the vessel. The lower hub 40 also has a pin receiving notch or groove 55, which in this embodiment is an angular ring around the upper inner corner of the hub 40.

The lower hub 40 has a number of preferably spaced mounting bores 48, through which can be inserted in a threaded fastener 50 such as for example a threaded bolt. The fastener 50 engages with a tapped bore 52 in the upper hub 30, and has a hex head 54 so that tightening of the threaded bolt 50 secures the lower hub body 40 to the upper hub body 30 in the configuration shown.

The threaded bolt 50 in this example has a hexagonal head 54 to facilitate tightening with a wrench, and also has a convex domed end 55. The domed end 55 facilitates sanitary properties of the device, because after emptying of the vessel or cleaning, any material that tends to drip down along the bottom of the hub assembly 10 will tend to find its lowest point at the domed end 55. The convex domed downward pointing shape of this domed part 55 of the acorn head tends to cause the materials to be released off the bottom due to surface tension properties of the shape.

The upper hub 30 also has an O-ring groove 60 which supports an O-ring 61. This groove 60 is also sized to be slightly smaller in cross-section than the volume of the O-ring 61 itself, so that it completely fills the groove, and protrudes out slightly, and thus provides a desirable seal, and also reduces the likelihood of material accumulating in the region adjacent the seal after draining or cleaning of the vessel the O-rings described above.

A respective O-ring 58 is also seated between the bottom surface of the lower hub body 40 and the surface of each fastener 50 underneath the hexagonal portion 54 as shown, and the ring and groove are designed as described above. In an illustrated embodiment, only two threaded bolts 50 are used. However, in some embodiments three or more equally spaced fasteners 50 may be employed.

Figure 2:
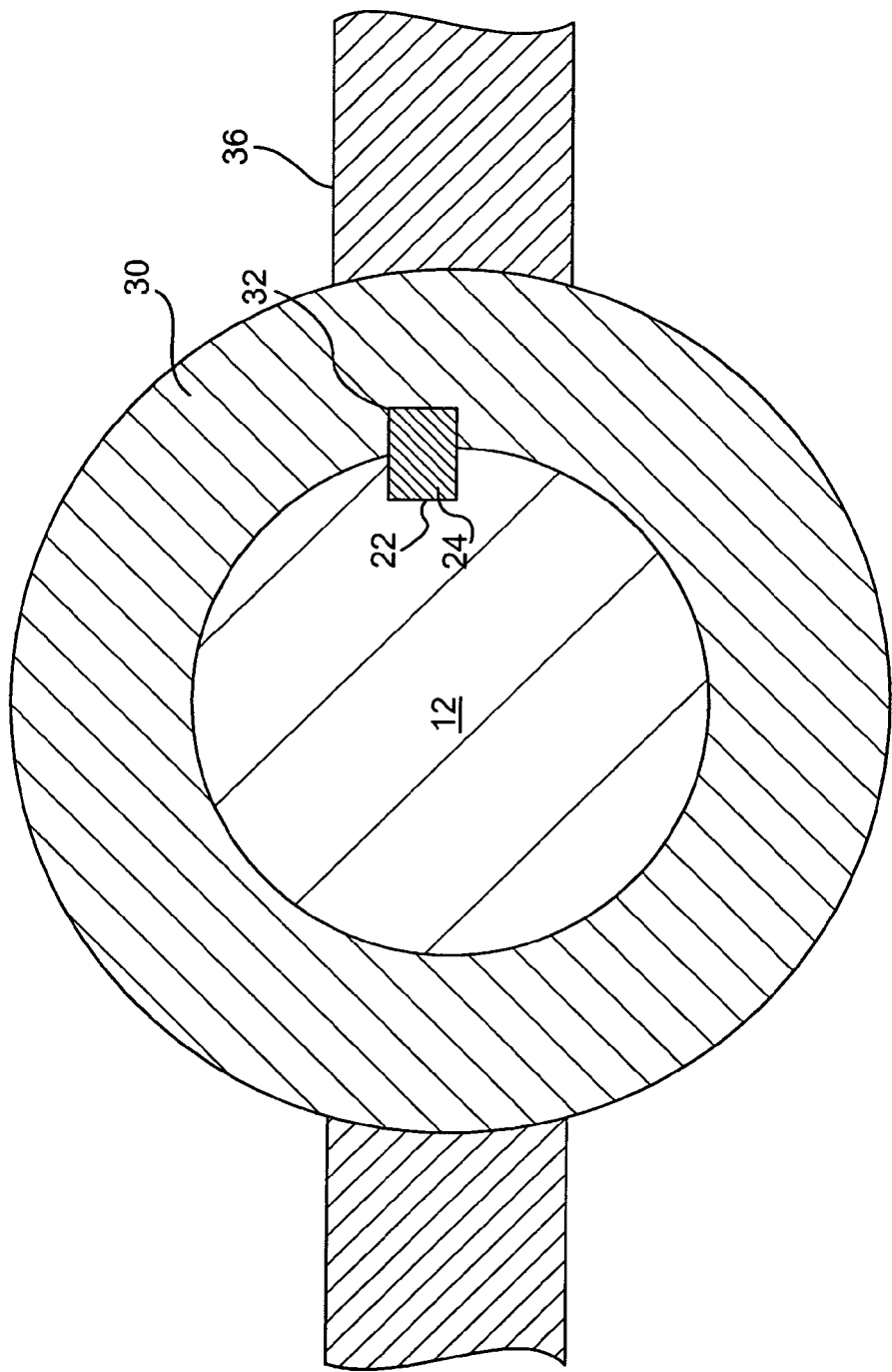
FIG. 2 is a cross-sectional view taken through Section 2-2 in FIG. 1, and also corresponds with a view taken through lines 2-2 in FIG. 4.

FIG. 2 shows a cross-section of the key piece 24 sitting in the keyways 22 and 32. In this example, the key piece 24 is a rectangular straight bar. However, in other embodiments the key piece 24 may be wider and may be curved around the center of curvature at the axis of the shaft. In such a case, the keyways 22 and 33 themselves will also have a curved inner surface. A keyway slot 32 portion is disposed in the upper hub 30 as well as a keyway slot 42 provided in the lower hub 40.

These two slots 32 and 42 together form one elongated slot to receive the key piece 24. However, providing the slot in both hubs provides positive torque resistance for both hub bodies, and therefore the fasteners 50 do not need to provide the torque resisting support. In some embodiments, it is possible to have only one of the hubs 30 or 40 have the keyway slot as a single feature. Also, one key piece 24 can be used.

Figure 3:
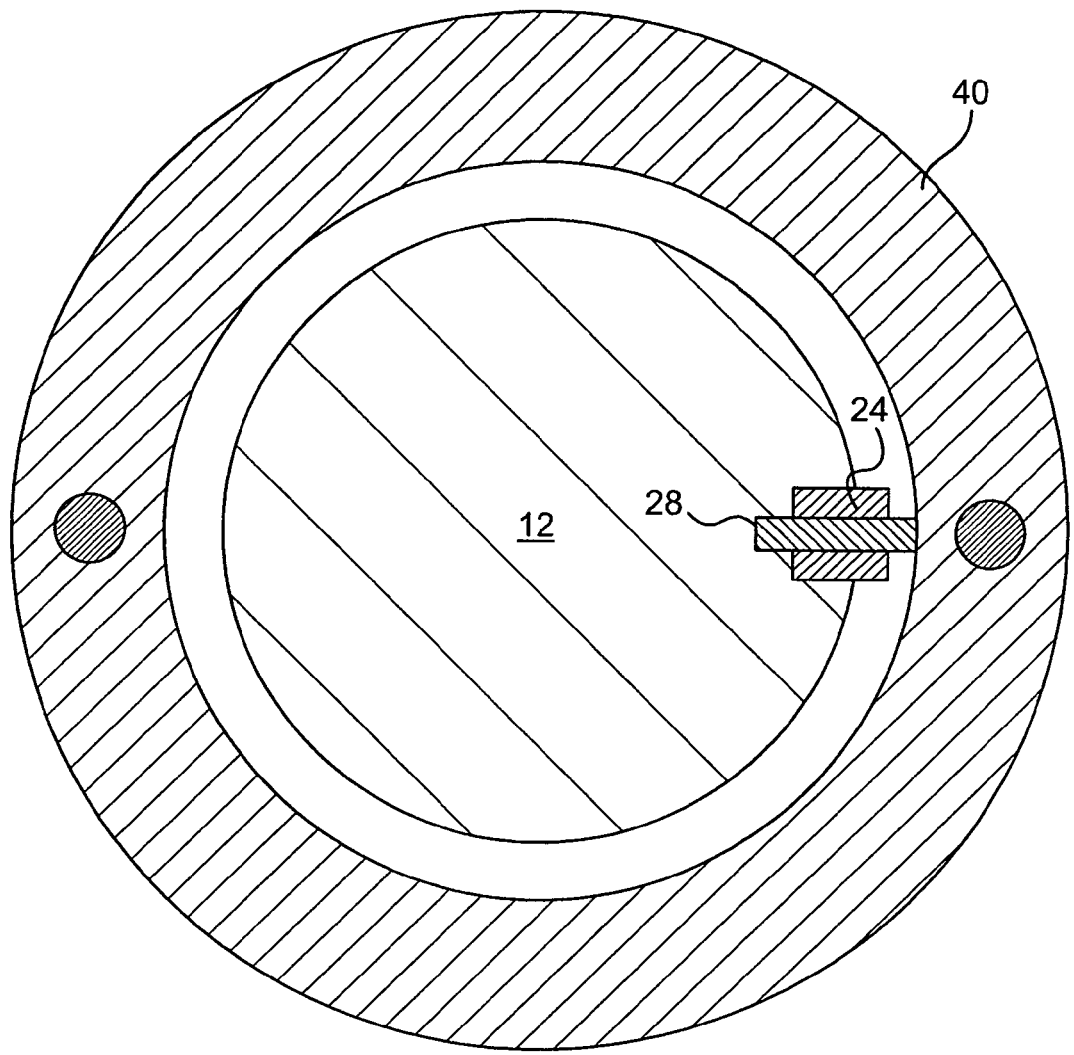
FIG. 3 is a cross-sectional view taken though Section 3-3 in FIG. 1.

FIG. 3 shows not only the key piece 24 but also the arrangement of the lock pin 28. The lock pin 28 fits directly into a pin slot 26 cut into the shaft 12 and extends out to one or both of the hubs 30 and 40. Whereas the key piece 24 provides a rotational locking function, the pin 28 provides an axial locking function. The lock pin 28 in the embodiment shown, fits within an annular channel that is formed by annular cut-outs on 35 and 45 seen in FIG. 1.

Figure 4:
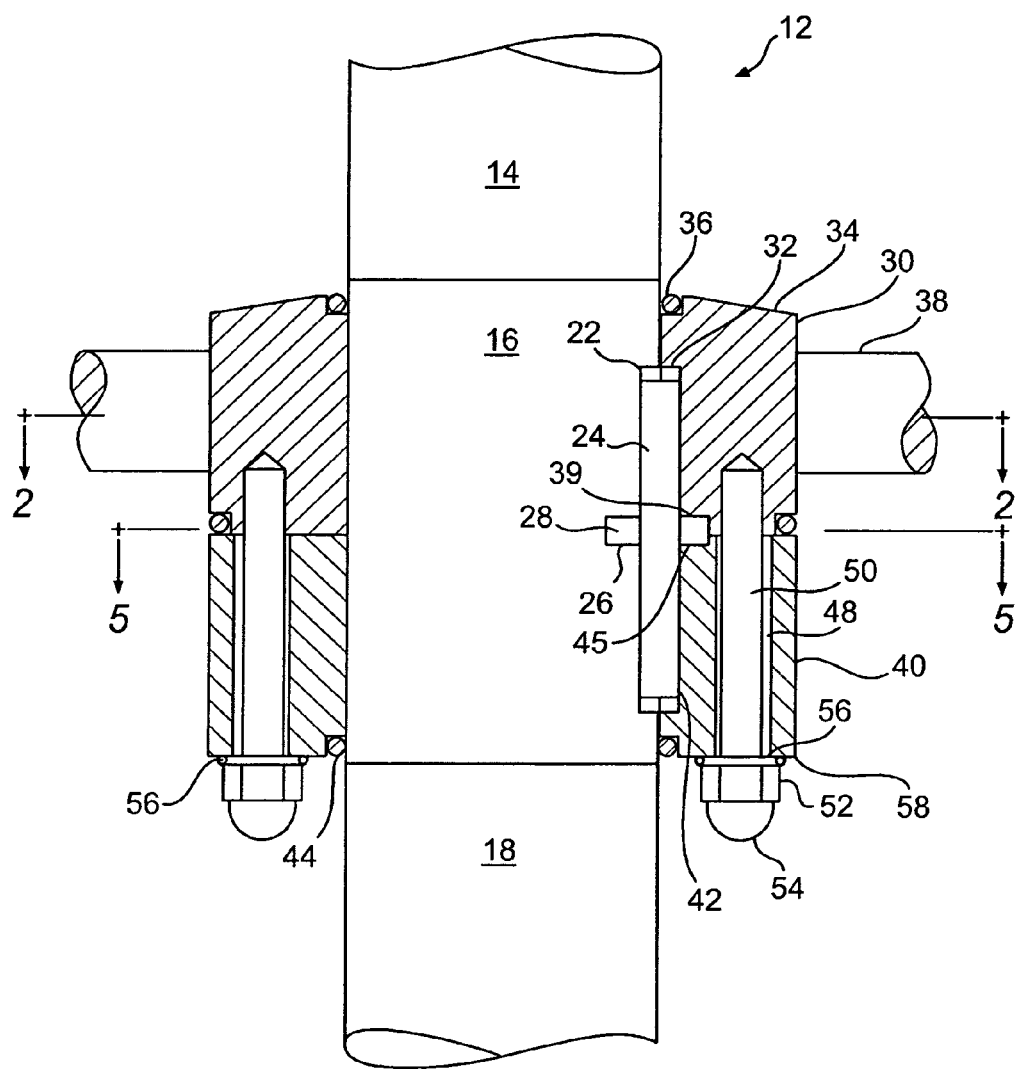
FIG. 4 is a view similar to FIG. 1, but showing an alternative embodiment of the present invention.
Figure 5:
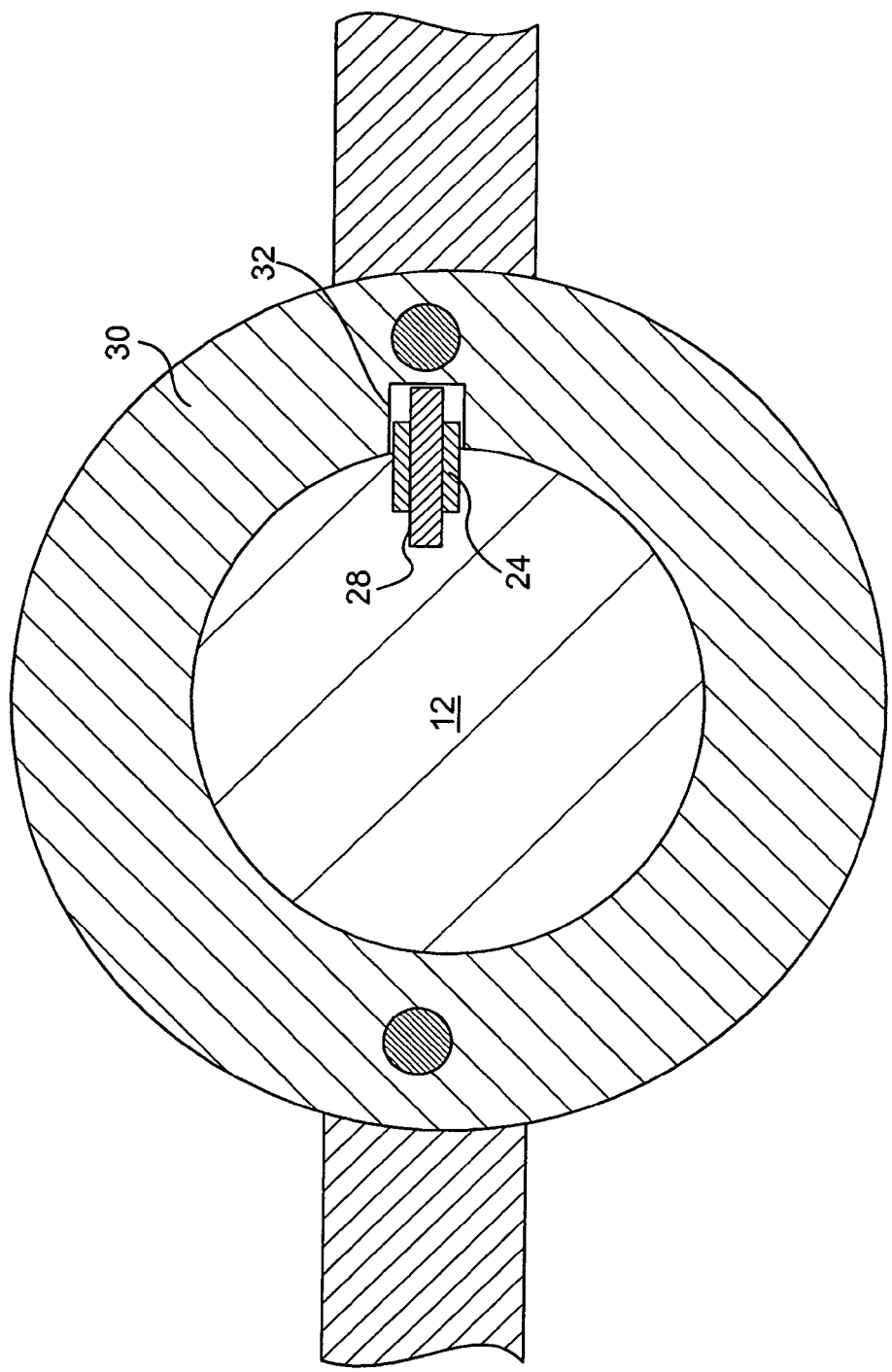
FIG. 5 is a cross-sectional taken through Section 5-5 in FIG. 4.

FIG. 4 shows an alternative embodiment, where instead of a channel being formed by a pair of annular cut-outs 35 and 45, instead a pin-receiving slot is formed by notches 39 and 49 cut into lower corners of the hub bodies 30 and 40 respectively. The shape of the cut-out formed by notches 39 and 49 in this embodiment can be seen in FIG. 5. In some embodiments, not shown, the pin 28 can engage with only one hub body 30 or 40, and not both as shown in FIG. 4.

Figure 6:
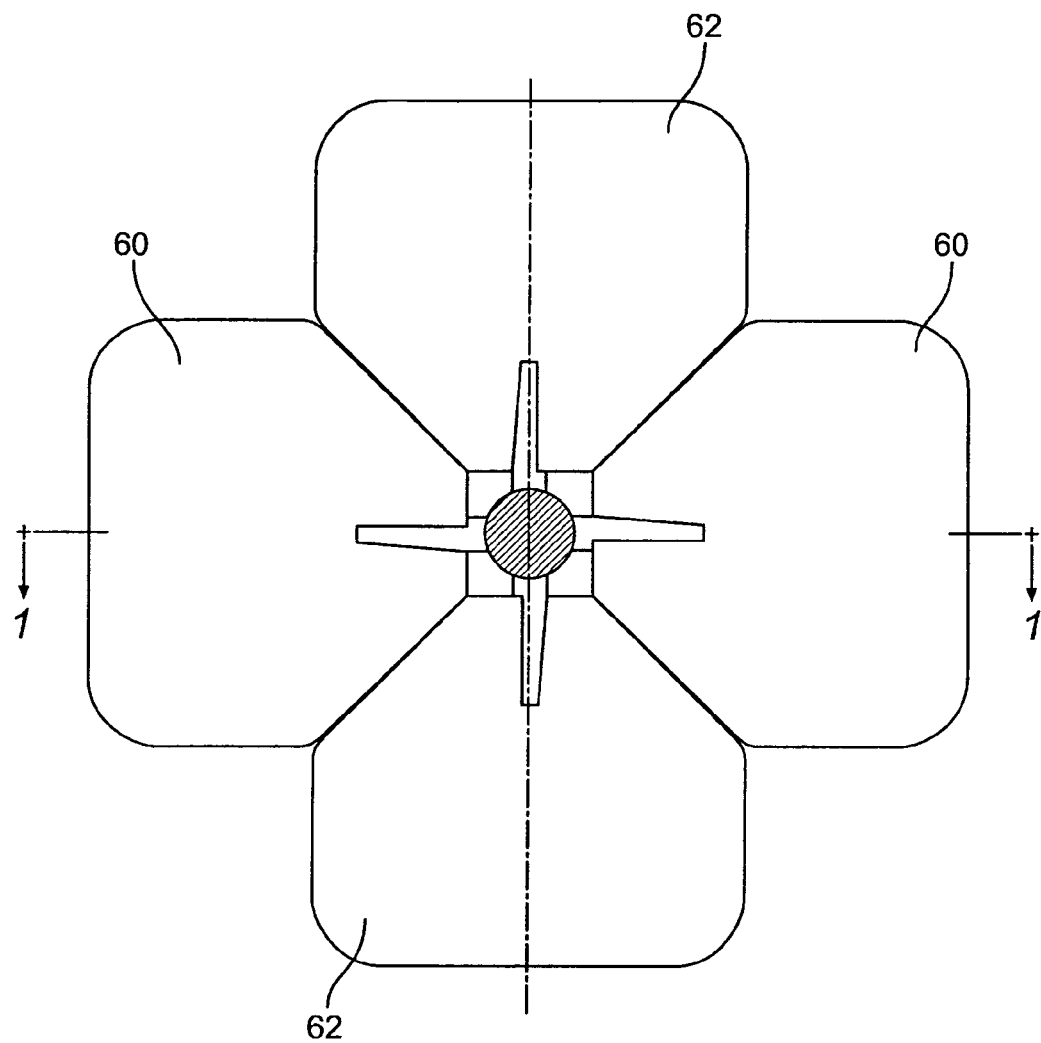
FIG. 6 is a view of an impeller assembly taken through Section 6-6 in FIG. 1.

FIG. 6 shows an example of an impeller arrangement with which the hub mounting systems and methods of the present invention may be used. The upper hub 30 supports two impeller blades 60. The lower hub 40 supports two other impeller blades 62. A benefit of this arrangement, is that for installation the opening in the vessel needs only be large enough for the two bladed hubs to each individually pass one at a time. In this way a larger impeller can be fit through a smaller opening as compared to a single hub supporting all four of the blades. In this illustrated example, only one upper hub and one lower hub are shown, and each support two blades. Of course, more blades could be attached to each hub. Further, in other embodiments an intermediate hub an be mounted in between the upper hub and the lower hub and this intermediate hub can also support any number of blades.

A method of installing the mount 10 for assembly onto a shaft 12 will now be described, particularly with reference to FIG. 1. Initially, an end of the shaft 12 is extending free, and none of the mounting assembly components are yet mounted to it.

Next, the upper hub body 30 is slid over the end of the shaft, with the O-ring 36 in place in its channel 37, and the upper hub 30 is moved vertically past its desired position so that the bottom of the upper hub body 30 is past the top of the key way 22. Next, the key piece 24 is pushed into the key way 22. Next, the upper hub body 30 is lowered, with its key way slot 32 aligned with the key piece 24 and slid down over a portion of the key piece 24 until it is substantially in its final installed position. However, it is not lowered so far as to obstruct the location of the pin 28 which has not yet been inserted. Next, the pin 28 is inserted and then the hub 30 can be lowered fully.

At this point, the key piece 24, pin 28, and hub 30 are all located where they will be in the final installed position, with the axial position of the hub 30 being defined by its contact with the pin 28.

Next, the lower hub 40 is slid over the end of the shaft and is brought upward to meet the upper hub 30. Before sliding the upper hub 40 upwards, the O-rings 60 are installed in place, and during the sliding motion the O-rings 46 remain in place. The keyway 42 is aligned with the key piece 24. The fasteners 50 are each inserted upwardly through the bores in the lower hub 40 and are tightened into the hub 30 by hand and/or with a wrench to secure the assembly together in the position shown in FIG. 1. At this time, each of the O-ring is checked to make sure it is fully seated. The O-rings 58 are slid over the fastener before the fasteners are installed.

The many features and advantages of the invention are apparent from the detailed specification, and thus, it is intended by the appended claims to cover all such features and advantanges of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hub mounting assembly for mounting a plurality of impellers onto a shaft, comprising:
   a first hub ring;
   a second hub ring;
   a first key piece adapted to engage with the shaft and engage with at least one of the hub rings; and
   a first lock pin adapted to engage with the shaft and engage with at least one of the hub rings, wherein the first hub ring is adapted to be fastened to the second hub ring, to trap the key piece and lock pin in a position so that the hub rings together form a hub that is locked against rotation and axial movement with respect to the shaft.

2. An assembly according to claim 1, wherein a first key piece receiving groove is disposed on the shaft to receive the key piece.

3. An assembly according to claim 2, wherein at least one of the first and second hub rings has a key piece receiving groove to receive the key piece.

4. An assembly to claim 3, wherein both the first and second hubs each have a respective key piece receiving groove to receive at last part of the key piece.

5. An assembly according to claim 1, wherein a first lock pin receiving groove is disposed on the shaft to receive the lock pin.

6. An assembly according to claim 2, wherein at least one of the first and second hub rings has a lock pin receiving feature to receive the lock pin.

7. An assembly to claim 3, wherein both the first and second hubs each have a respective lock pin receiving feature that receive part of the lock pin.

8. An assembly according to claim 1, further comprising a fastener that attaches the first hub ring to the second hub ring.

9. An assembly according to claim 1, further comprising at least one impeller mounted to one of the hub rings.

10. A hub mounting assembly for mounting a plurality of impellers onto a shaft, comprising:
    a first hub ring;
    a second hub ring;
    a first engaging means adapted to engage with the shaft and engage with at least one of the hub rings; and
    a second engaging means adapted to engage with the shaft and at least one of the hub rings, wherein the first hub ring is adapted to be fastened to the second hub ring, to trap the first engaging means and the second engaging means in a position so that the hub rings together form a hub that is locked against rotation and axial movement with respect to the shaft.

11. An assembly according to claim 10, wherein a first engaging means receiving groove is disposed on the shaft to receive the first engaging means.

12. An assembly according to claim 11, wherein at least one of the first and second hub rings has a first engaging means receiving groove to receive the first engaging means.

13. An assembly to claim 12, wherein both the first and second hubs each have a first engaging means receiving groove to receive at last part of the first engaging means.

14. An assembly according to claim 10, wherein a second engaging means receiving groove is disposed on the shaft to receive the second engaging means.

15. An assembly according to claim 14, wherein at least one of the first and second hub rings has a second engaging means receiving feature to receive the second engaging means.

16. An assembly to claim 15, wherein both the first and second hubs each have a second engaging means receiving feature that receives part of the second engaging means.

17. An assembly according to claim 10, further comprising means for fastening the first hub ring to the second hub ring.

18. An assembly according to claim 10, further comprising at least one impeller mounted to one of the hub rings.

19. A method for attaching a plurality of impellers to a shaft, comprising:
  installing a first hub ring at a location on the shaft;
  installing a key piece into engagement with the shaft;
  installing a lock pin into engagement with the shaft; and
  fastening a second hub ring to the first hub ring.

20. A method according to claim 19, wherein the key piece and lock pin engage with each other, as well as with at least one hub ring.

* * * * *